US011372912B2

(12) United States Patent
Ogura

(10) Patent No.: US 11,372,912 B2
(45) Date of Patent: Jun. 28, 2022

(54) SERVER, COMMUNICATION SYSTEM, AND COMMUNICATION METHOD

(71) Applicant: Ricoh Company, Ltd., Tokyo (JP)

(72) Inventor: Yoshihiro Ogura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 27 days.

(21) Appl. No.: 16/923,440

(22) Filed: Jul. 8, 2020

(65) Prior Publication Data

US 2021/0034658 A1 Feb. 4, 2021

(30) Foreign Application Priority Data

Jul. 31, 2019 (JP) .............................. JP2019-141601

(51) Int. Cl.
*G06F 16/538* (2019.01)
*G06K 19/06* (2006.01)
*G06F 16/955* (2019.01)
*G06F 16/93* (2019.01)

(52) U.S. Cl.
CPC ............ *G06F 16/538* (2019.01); *G06F 16/94* (2019.01); *G06F 16/9558* (2019.01); *G06K 19/06037* (2013.01)

(58) Field of Classification Search
CPC ... G06F 16/538; G06F 16/9558; G06F 16/381
See application file for complete search history.

(56) References Cited

U.S. PATENT DOCUMENTS

| | | | |
|---|---|---|---|
| 2013/0044220 A1* | 2/2013 | Demicell | H04N 7/181 348/158 |
| 2013/0073719 A1 | 3/2013 | Ando | |
| 2013/0345502 A1* | 12/2013 | Mitsunaga | G11B 27/105 600/103 |
| 2020/0084291 A1 | 3/2020 | Ando | |
| 2020/0388363 A1* | 12/2020 | Docktor | G06F 21/6245 |

FOREIGN PATENT DOCUMENTS

| | | |
|---|---|---|
| JP | 2013-077279 | 4/2013 |
| JP | 2014-149633 | 8/2014 |

\* cited by examiner

*Primary Examiner* — Baoquoc N To
(74) *Attorney, Agent, or Firm* — Xsensus LLP

(57) ABSTRACT

A server for managing inspection information of one or more structures includes circuitry configured to store identification information uniquely assigned to an information source associated with a structure, and image data of the structure previously captured in association with each other as an inspection result of the structure; receive from a communication terminal, via a communication network, the identification information of the information source acquired by the communication terminal; create data of a screen used for displaying the image data of the structure previously captured corresponding to the identification information received from the communication terminal; and transmit the data of the screen used for displaying the image data of the structure previously captured to the communication terminal via the communication network.

18 Claims, 11 Drawing Sheets

FIG. 5A

| INFORMATION SOURCE ID | URL OF ACCESS DESTINATION |
|---|---|
| d0001 | https://··· |

FIG. 5B

| INFORMATION SOURCE ID | PASSCODE | URL OF TRANSFER DESTINATION (REDIRECT DESTINATION) |
|---|---|---|
| d0001 | p0123 | https://··· |
| ⋮ | ⋮ | ⋮ |

FIG. 6A

| INFORMATION SOURCE ID | BIBLIOGRAPHIC INFORMATION |
|---|---|
| d0001 | STRUCTURE NAME: xx BRIDGE<br>LOCATION: abc STREET, def COUNTY, ghi CITY<br>INSPECTION CONTRACTOR: pqr CONSTRUCTION COMPANY |
| ... | ... |

FIG. 6B

| INFORMATION SOURCE ID | IMAGE CAPTURE DATE | IMAGE DATA OF STRUCTURE |
|---|---|---|
| d0001 | 2016/4/1 | ----.jpg |
|  | 2017/4/1 | ----.jpg |
|  | 2018/4/1 | ----.jpg |
| ... | ... | ... |

FIG. 6C

| INFORMATION SOURCE ID | PASSCODE | BIBLIOGRAPHIC INFORMATION | INSPECTION DATE | INSPECTION RESULT | REVIEW COMMENT | IMAGE DATA OF STRUCTURE |
|---|---|---|---|---|---|---|
| d0001 | p0123 | STRUCTURE NAME: xx BRIDGE<br>LOCATION: abc STREET,<br>def COUNTY, ghi CITY<br>INSPECTION CONTRACTOR:<br>pqr CONSTRUCTION COMPANY | 2019/4/1 | NO ABNORMALITY | INSPECTION FOR ONE-YEAR INTERVAL IS REQUIRED | ----.jpg |
| ... | ... | ... | ... | ... | ... | ... |

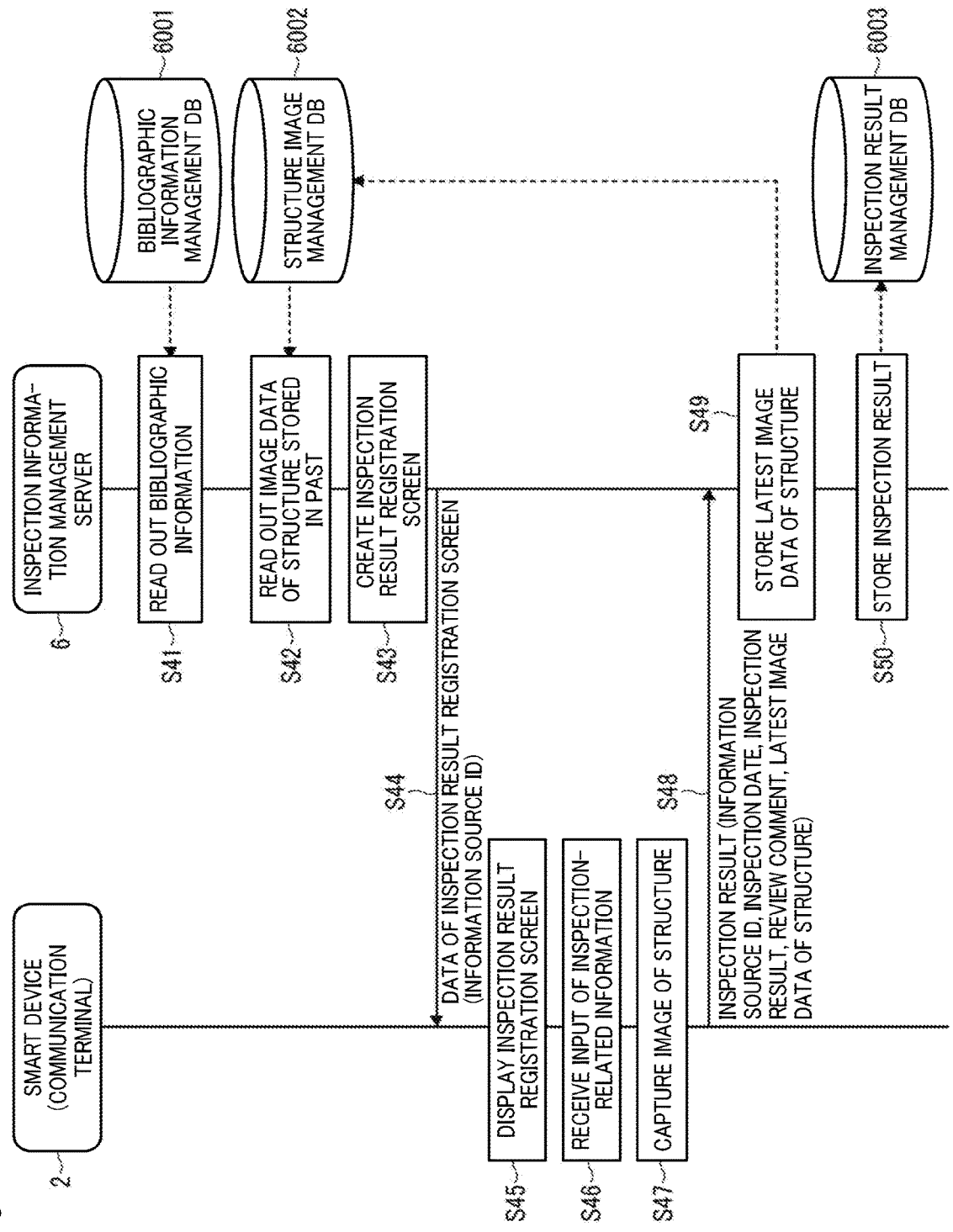

FIG. 10

| | https://··· | |
|---|---|---|
| STEP1 REGISTER REQUIRED INFORMATION REGISTER INSPECTION RESULT AND REVIEW COMMENT BASED ON INSPECTOR INSTRUCTION | | |
| STRUCTURE NAME | xx BRIDGE | ⎫ BIBLIOGRAPHIC INFORMATION |
| LOCATION | abc STREET, def COUNTY, ghi CITY | |
| INSPECTION CONTRACTOR | pqr CONSTRUCTION COMPANY | ⎭ |
| INSPECTION DATE | | ⎫ INPUT FIELD "a1" |
| INSPECTION RESULT | ▼ | |
| REVIEW COMMENT | | ⎭ |

STEP2 REGISTER IMAGE DATA
PRESS ADD BUTTON TO SWITCH TO CAMERA MODE. CAPTURE IMAGE BY REFERRING PAST IMAGE DATA.

[LATEST IMAGE display field] — LATEST IMAGE DISPLAY FIELD "a2"

LATEST IMAGE | ADD BUTTON — ADD BUTTON "a3"

◁ 16/04/01 | PAST IMAGE 17/04/01 | 18/04/01 ▷

STEP3 TRANSMIT REGISTRATION DATA
PRESS UPLOAD TO TRANSMIT REGISTRATION DATA ( CANCEL )    ( UPLOAD )

FIG. 11

| | |
|---|---|
| https://••• | |

STEP1  REGISTER REQUIRED INFORMATION
REGISTER INSPECTION RESULT AND REVIEW COMMENT BASED ON INSPECTOR INSTRUCTION

| | | |
|---|---|---|
| STRUCTURE NAME | xx BRIDGE | ⎫ BIBLIOGRAPHIC INFORMATION |
| LOCATION | abc STREET, def COUNTY, ghi CITY | |
| INSPECTION CONTRACTOR | pqr CONSTRUCTION COMPANY | ⎭ |
| INSPECTION DATE | 2019/4/1 | ⎫ INPUT FIELD "a1" |
| INSPECTION RESULT | NO ABNORMALITY ▼ | |
| REVIEW COMMENT | INSPECTION FOR ONE-YEAR INTERVAL IS REQUIRED | ⎭ |

STEP2  REGISTER IMAGE DATA
PRESS ADD BUTTON TO SWITCH TO CAMERA MODE. CAPTURE IMAGE BY REFERRING PAST IMAGE DATA.

LATEST IMAGE — LATEST IMAGE DISPLAY FIELD "a2"

ADD BUTTON — ADD BUTTON "a3"

◀  16/04/01    PAST IMAGE 17/04/01    18/04/01  ▶

STEP3  TRANSMIT REGISTRATION DATA
PRESS UPLOAD TO TRANSMIT REGISTRATION DATA

CANCEL      UPLOAD

SERVER, COMMUNICATION SYSTEM, AND COMMUNICATION METHOD

CROSS-REFERENCE TO RELATED APPLICATION

This application claims priority pursuant to 35 U.S.C. § 119(a) to Japanese Patent Application No. 2019-141601, filed on Jul. 31, 2019 in the Japan Patent Office, the disclosure of which is incorporated by reference herein in its entirety.

BACKGROUND

Technical Field

This disclosure relates to a server for managing or controlling inspection information, a communication system, and a communication method.

Background Art

Infrastructure maintenance and inspection works are performed periodically to inspect or checks structures, such as bridges and tunnels. Inspection works of structures at inspection sites are performed by inspectors having expertise and skills, and assistants, such as part-time assistants, who do not have expertise knowledge and skills.

Typically, the inspectors perform inspection works to determine the level of deterioration of structures, and prepares assessment based on the inspection works while the assistants perform supporting or assisting works, such as image capturing operation of structures to record the current state of structures. For example, the assistants use communication terminals, such as smart devices, to capture current images of structures at the inspection sites, and uploads the captured images to a server. With this procedure, the server can accumulate past and current images of the same structure, which can be used to determine deterioration of the each structure over time. Therefore, it is preferable that the assistants capture current images of the structures with the same photography composition as the images of the structures captured in the past.

However, it is difficult for the inspectors to remember the photography composition of past images because a large number of inspection sites and structures have been inspected. Further, the assistants, such as part-time assistants, may not have any opportunities to see the images of the structures captured in the past.

Therefore, if the inspectors or assistants access the server using the smart devices or the like, and download the past images of the same structure from the server, the inspectors or assistants can determine the photography composition of the structures to be captured by referring to the past images of the structures.

However, because there are many inspection sites and structures, it is difficult for the inspectors or assistants to access the server using the smart devices or the like, and to find the past images of the same structure.

SUMMARY

As one aspect of the present disclosure, a server for managing inspection information of one or more structures is devised. The server includes circuitry configured to store identification information uniquely assigned to an information source associated with a structure, and image data of the structure previously captured in association with each other as an inspection result of the structure; receive from a communication terminal, via a communication network, the identification information of the information source acquired by the communication terminal; create data of a screen used for displaying the image data of the structure previously captured corresponding to the identification information received from the communication terminal; and transmit the data of the screen used for displaying the image data of the structure previously captured to the communication terminal via the communication network.

As another aspect of the present disclosure, a communication system is devised. The communication system includes a communication terminal; and a server for managing inspection information of one or more structures. The server includes circuitry configured to store identification information uniquely assigned to an information source associated with a structure, and image data of the structure previously captured in association with each other as an inspection result of the structure; receive from the communication terminal, via a communication network, the identification information of the information source acquired by the communication terminal; create data of a screen used for displaying the image data of the structure previously captured corresponding to the identification information received from the communication terminal; and transmit the data of the screen used for displaying the image data of the structure previously captured to the communication terminal via the communication network.

As another aspect of the present disclosure, a method of managing inspection information of one or more structures is devised. The method includes storing identification information uniquely assigned to an information source associated with a structure, and image data of the structure previously captured in association with each other as an inspection result of the structure; receiving from a communication terminal, via a communication network, the identification information of the information source acquired by the communication terminal; creating data of a screen used for displaying the image data of the structure previously captured corresponding to the identification information received from the communication terminal; and transmitting the data of the screen used for displaying the image data of the structure previously captured to the communication terminal via the communication network.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 5A is an example of data structure of access destination information;

FIG. 5B is an example of transfer destination management table;

FIG. 6A is an example of bibliographic information management table;

FIG. 6B is an example of structure image management table;

FIG. 6C is an example of inspection result management table;

FIG. 9 is an example of sequence diagram illustrating a process of registering an inspection result;

FIG. 10 is an example of inspection result registration screen displayable on a smart device as an initial screen; and FIG. 11 is an example of inspection result registration screen displayable on a smart device after inputting inspection information.

The accompanying drawings are intended to depict embodiments of the this disclosure and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of a communication system according to an embodiment in detail with reference to the drawings.

(System Configuration)

Figure 1:
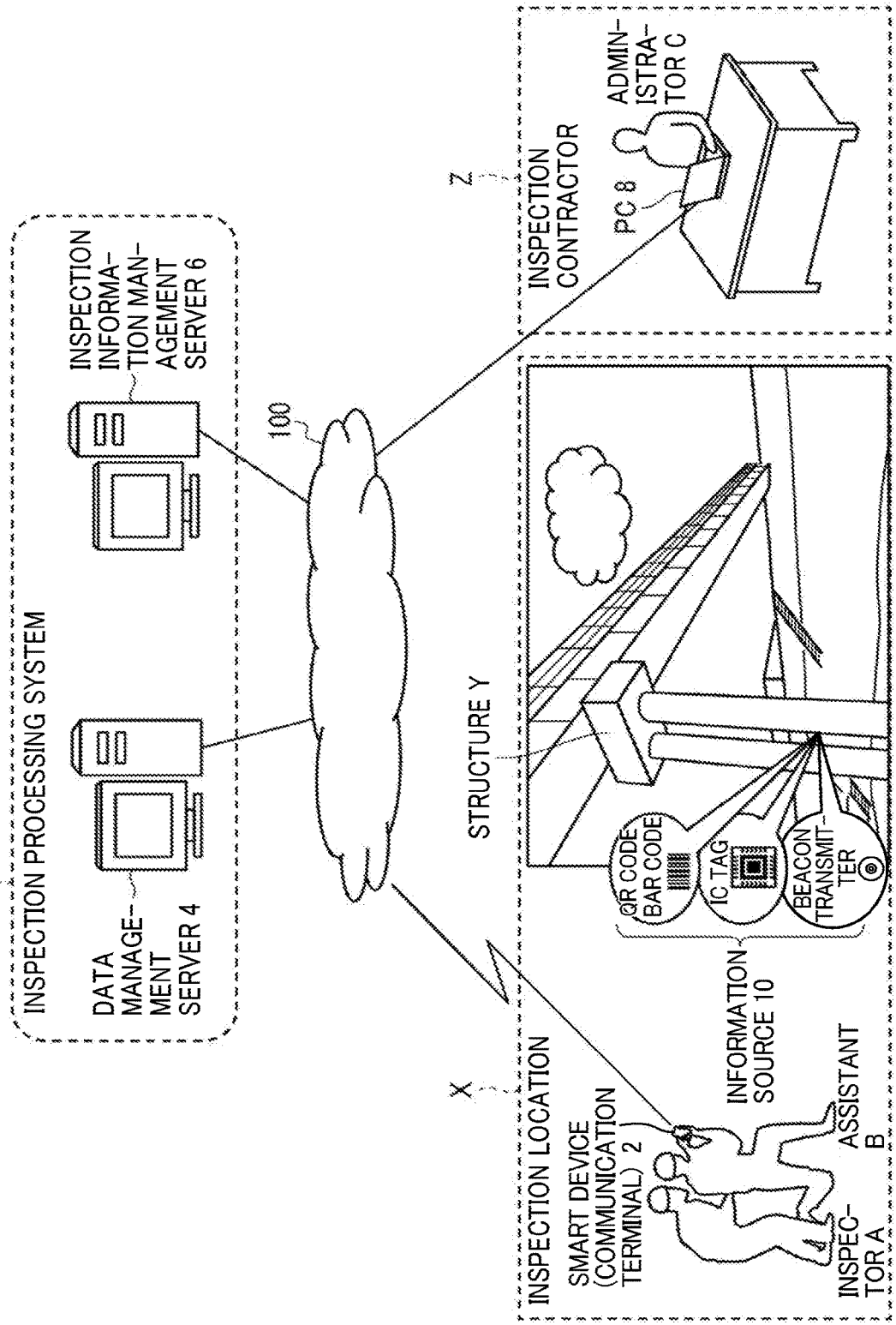
FIG. 1 illustrates an example of system configuration of a communication system according to an embodiment.

Hereinafter, a description is given of an outline of system configuration of a communication system 1000. FIG. 1 illustrates an example of system configuration of a communication system 1000 according to the embodiment of this disclosure.

As illustrated in FIG. 1, the communication system 1000 can be configured with, for example, a smart device 2 (communication terminal), a data management server 4, an inspection information management server 6, and a personal computer (PC) 8. Hereinafter, the smart device 2 may be also referred to as the smart phone, the data management server 4 may be also referred to as the data server or server for managing data, and the inspection information management server 6 may be also referred to as the inspection information server or server for managing inspection information.

The smart device 2 can communicate with the data management server 4, the inspection information management server 6, and the PC 8 via a communication network 100. The communication network 100 is configured with, for example, the Internet, mobile communication network, local area network (LAN), and the like. The communication network 100 is not limited to wired communication network, but can be wireless communication network, such as 3G (Third Generation), Worldwide Interoperability for Microwave Access (WiMAX: registered trademark), Long Term Evolution (LTE), and the like.

As illustrated in FIG. 1, when an inspector A inspects or checks a structure Y at an inspection location (inspection site) X during a periodic inspection work, and an assistant B requests a registration screen used for registering an inspection result of the structure X by using the smart device 2, the smart device 2 acquires, from information source 10 associated with the structure Y, information source identification (ID) identifying the information source 10, and universal resource locator (URL) as access destination to which the registration screen is requested. In this description, the information source 10 provides information of identification (ID) identifying the information source 10, and the information source 10 can be also referred to as the information provider, information indicator, or information identifier. To be described later, the information source 10 associated with the structure Y can be used to processing of data related to the structure Y, such as accessing, searching, retrieving, storing, registering the data related to the structure Y in the communication system.

The structure Y is, for example, bridge (bridge structure), tunnel or the like. The structure Y also includes, for example, piping or tubes used for transporting materials, such as gas, liquid, powder, and granular substance, and a vertical hole-shaped reinforced concrete structure object, such as a hoistway used as an elevator shaft in which a lift or an elevator travels. The structure Y also includes real estate, such as apartments and condominiums.

The information source 10 includes, for example, a seal printed with given code information, such as quick response (QR) code and bar code, an integrated circuit (IC) tag, a beacon transmitter, or the like. In a case of QR code, as illustrated in FIG. 5A, various information, such as information source ID, and URL as access destination, is embedded. When the seal having the QR code is attached to the structure, the QR code and structure are associated with each other. The smart device 2 acquires various information of the QR code using an application of QR code scanner installed on the smart device 2.

In a case of the IC tag, the smart device 2 can communicate using short-range communication technology, such as Near Field Communication (NFC: registered trademark), Bluetooth (registered trademark) or the like with the IC tag. When the IC tag is attached to the structure Y, the IC tag and the structure Y are associated with each other.

In a case of the beacon transmitter, when the smart device 2 enters a radio wave range of the beacon transmitter, the smart device 2 can communicate with the beacon transmitter using the radio wave transmitting from the beacon transmitter. When the beacon transmitter is attached to the structure Y, the beacon transmitter and the structure Y are associated with each other.

Further, the attachment of the information source 10 to the structure Y is not required to associate the information source 10 and the structure Y with each other. For example, the information source 10 may be attached or disposed at a position closer to the structure Y existing in the vicinity of the structure Y, which means the information source 10 is not attached on the structure Y directly.

Further, if a plurality of structures exists at one site, the information source 10 corresponding to each one of plurality of structures can be attached on one single guide board with photo images of each one of plurality of structures, or the information source 10 corresponding to each one of plurality of structures can be set on a guide board provided for each one of plurality of structures.

As described above, the smart device 2 acquires various information from the information source 10, such as such as information source ID, and URL as access destination as illustrated in FIG. 5A.

Then, the assistant B accesses the data management server 4 using the smart device 2, and requests a registration screen used for registering the inspection result of the structure X. Then, the data management server 4 requests the registration screen to the inspection information management server 6. Then, the inspection information management server 6 transmits data of the registration screen to the smart device 2. Then, at the inspection location X, the assistant B captures latest images of the structure Y using the smart device 2, and inputs the inspection result under the instruction of the inspector A using the smart device 2. Further, in some cases, the inspector A may perform the image capture operation and/or imputing of inspection result.

The smart device 2 uploads the image data and the inspection result data of the structure to the inspection information management server 6 to register the image data and the inspection result data of the structure in the inspection information management server 6. With this configuration, an administrator C of an inspection contractor Z can access the inspection information management server 6 from the PC 8 to acquire and view the image data and the inspection result data of the registered structure.

Further, the data management server 5 and the inspection information management server 6 are configured with a single or a plurality of computers. The data management server 4 and the inspection information management server 6 configure an inspection management system 3. The functions of the data management server 4 and the inspection information management server 6 can be included in the inspection management systems 3.

Further, the smart device 2 is an example of communication terminal, such as mobile or portable communication terminal. The communication terminal includes, for example, tablet PC, laptop PC, smartwatch, portable game machine, or the like.

(Hardware Configuration)

Hereinafter, with reference to FIGS. 2 and 3, a description is given of hardware configuration of the terminal and the server configuring the communication system 1000.

(Hardware Configuration of Smart Device)

Figure 2:
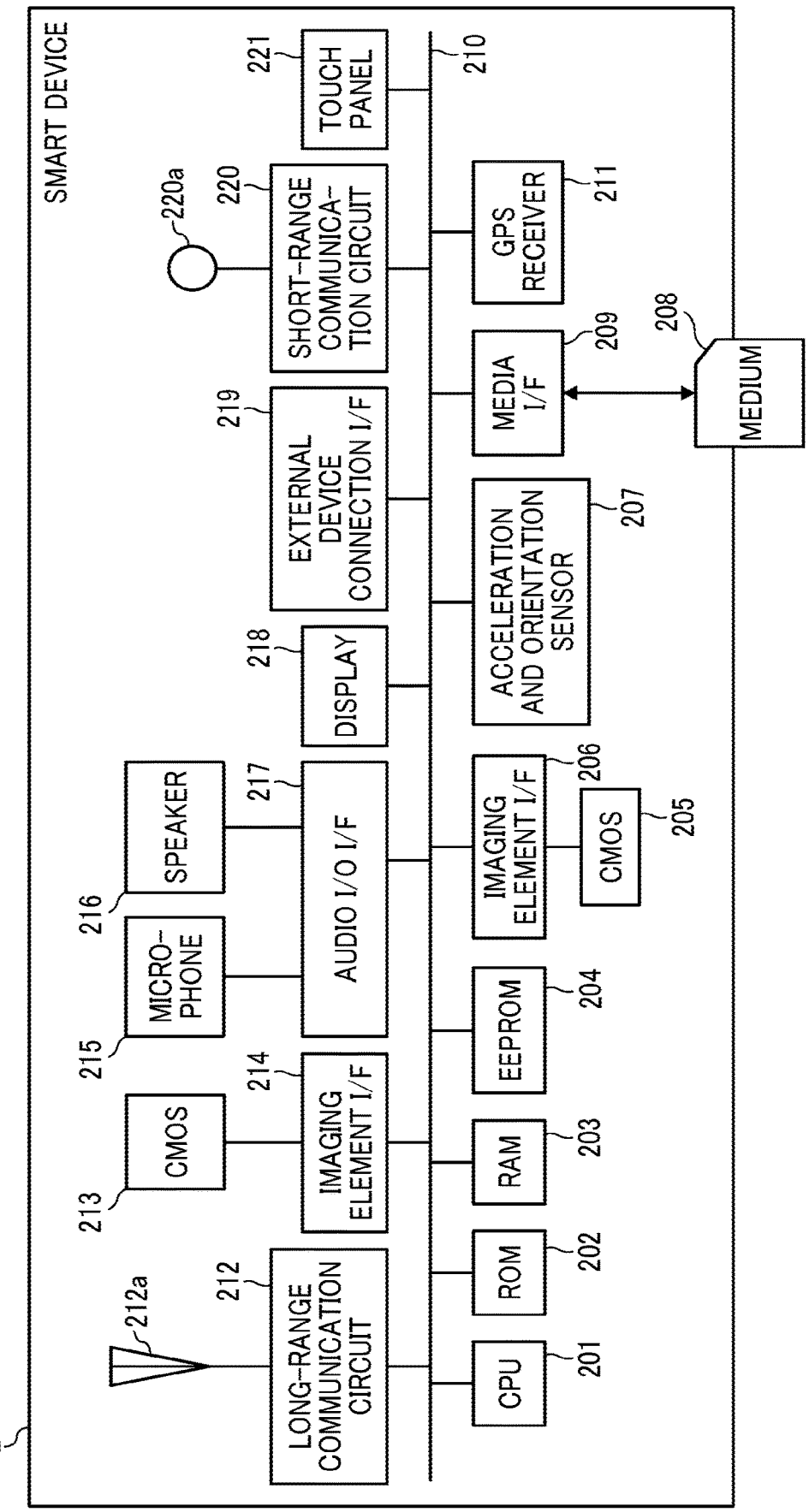
FIG. 2 is an example of configuration of hardware block diagram of a smart device.

FIG. 2 is an example of configuration of hardware block diagram of the smart device 2. As illustrated in FIG. 2, the smart device 2 includes, for example, a central processing unit (CPU) 201, a read-only memory (ROM) 202, a random access memory (RAM) 203, an electrically erasable programmable read-only memory (EEPROM) 204, a complementary metal oxide semiconductor (CMOS) 205, an imaging element interface (I/F) 206, an acceleration and orientation sensor 207, a media interface (I/F) 209, and a GPS receiver 211.

The CPU 201 controls the operation of the smart device 2 entirely. The ROM 202 stores programs used for driving the CPU 201, such as initial program loader (IPL). The RAM 203 is used as a work area of the CPU 201. The EEPROM 204 reads and writes various data, such as programs for the smart device 2 under the control of the CPU 201.

The complementary metal oxide semiconductor (CMOS) 205 is a built-in type image capture unit or means, such as imaging sensor, that captures images of an object (e.g., self-image) and acquires image data of the captured images under the control of the CPU 201. Further, the charge coupled device (CCD) sensor can be used as the image capture unit or means. The image element I/F 206 is a circuit that controls the driving of the CMOS 205.

The acceleration and orientation sensor 207 includes various sensors such as an electronic magnetic compass, a gyrocompass, and an acceleration sensor to detect the geomagnetism.

The media I/F 209 controls reading and writing (storing) of data to a recording medium 208, such as flash memory. The GPS receiver 211 receives GPS signals from GPS satellites.

As illustrated in FIG. 2, the smart device 2 further includes, for example, a long-range communication circuit 212, a CMOS 213, an imaging element I/F 214, a microphone 215, a speaker 216, an audio input/output I/F 217, a display 218, an external device connection interface (I/F) 219, a short-range communication circuit 220, an antenna 220a of the short-range communication circuit 220, and a touch panel 221.

The long-range communication circuit 212 is a circuit that communicates with other devices via the communication network 100.

The CMOS 213 is a built-in type image capture unit or means that captures images of object and acquires image data of the captured images under the control of the CPU 201. The imaging element I/F 214 is a circuit for controlling the drive of the CMOS 213.

The microphone 215 includes a built-in type circuit that converts audio signals into electrical signals. The speaker 216 includes a built-in type circuit that generates audio, such as music and audio sounds, by converting the electric signals to physical vibration. The audio input/output I/F 217 is a circuit that processes the input and output of audio signals with the microphone 215 and the speaker 216 under the control of the CPU 201. The display 218 is a display unit, such as liquid crystal or organic electro luminescence (EL) display, which displays images of object and various icons.

The external device connection I/F 219 is an interface for connecting various external devices. The short-range communication circuit 220 is a communication circuit, such as Near Field Communication (NFC: registered trademark) or Bluetooth (registered trademark). The touch panel 221 is a type of input unit configured to operate the smart device 2 by performing pressing operation on the display 218 by a user.

The smart device 2 further includes a bus line 210. The bus line 210 is an address bus and data bus for electrically connecting components illustrated in FIG. 2, such as the CPU 201.

(Hardware Configuration of Data Management Server)

Hereinafter, with reference to FIG. 3, a description is given of hardware configuration of the data management server 4. FIG. 3 is an example of configuration of hardware block diagram of the data management server 4.

Figure 3:
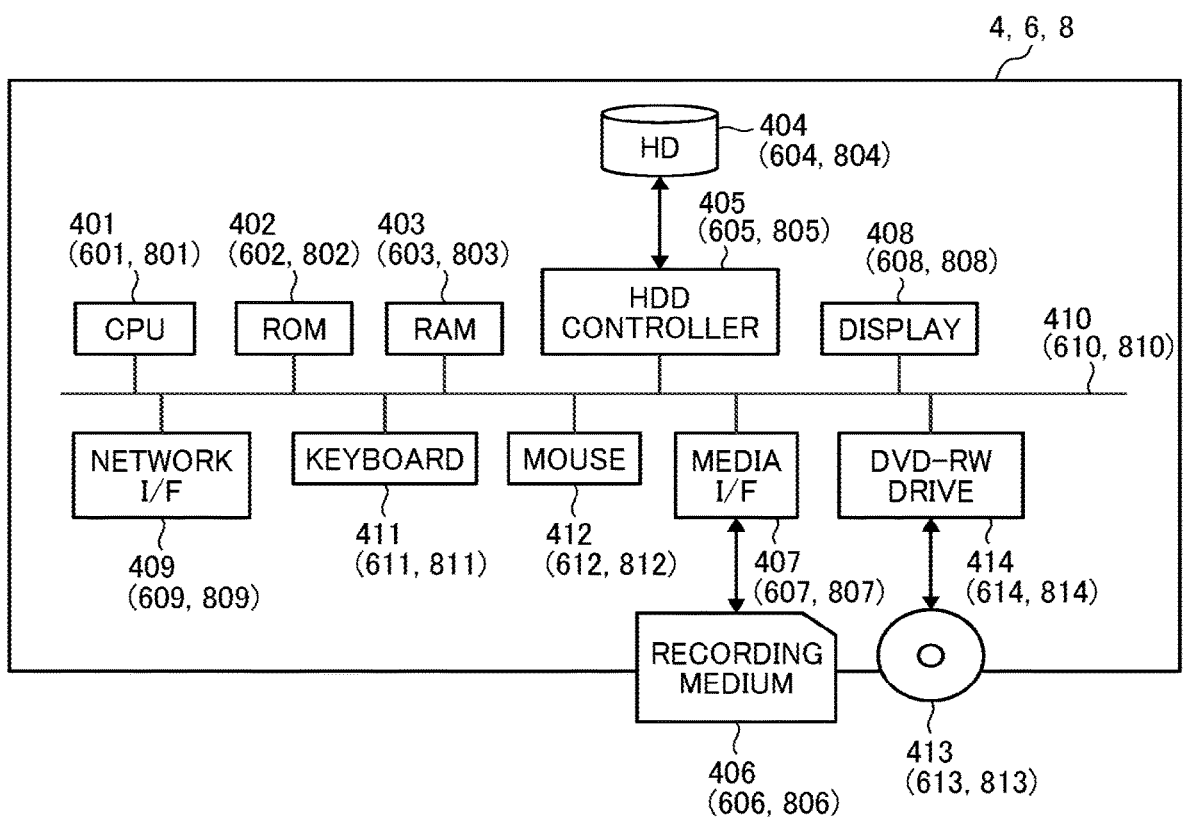
FIG. 3 is an example of configuration of hardware block diagram of a data management server, an inspection information management server, and a PC.

As illustrated in FIG. 3, the data management server 4 is configured with a computer including, for example, a CPU 401, a ROM 402, a RAM 403, a HD 404, a hard disk drive (HDD) controller 405, a media I/F 407, a display 408, a network I/F 409, a bus line 410, a keyboard 411, a mouse 412, and a digital versatile disk rewritable (DVD-RW) drive 414.

The CPU 401 controls the operation of the data management server 4 entirely. The ROM 402 stores programs used for driving the CPU 401, such as initial program loader (IPL). The RAM 403 is used as a work area of the CPU 401.

The HD 404 stores various data, such as programs. The HDD controller 405 controls reading and writing of various data to the HD 404 under the control of the CPU 401.

The display 408 displays various information, such as cursor, menu, window, characters, and image. The media I/F 407 controls reading and writing (storing) of data to a recording medium 415, such as flash memory.

Further, the network I/F 409 is an interface for data communication using the communication network 100. The bus line 410 is an address bus and a data bus for electrically connecting each component illustrated in FIG. 3, such as the CPU 401.

The keyboard 411 is a type of input unit including a plurality of keys used for inputting, such as characters, numbers, and various instructions. The mouse 412 is a type of input unit used for selecting various instructions, performing various instructions, selecting process target, moving a cursor, or the like. The DVD-RW drive 414 controls reading and writing of various data to a DVD-RW 413, which is an example of removable recording medium.

Further, instead of DVD-RW, DVD-R or Blu-ray Disc (registered trademark) can be used. The same applies to the inspection information management server 6 and the PC 8.
(Hardware Configuration of Inspection Information Management Server)

Hereinafter, with reference to FIG. 3, a description is given of hardware configuration of the inspection information management server 6. FIG. 3 also illustrates a hardware configuration of the inspection information management server 6.

As illustrated in FIG. 3, the inspection information management server 6 is configured with a computer including, for example, a CPU 601, a ROM 602, a RAM 603, a HD 604, a HDD controller 605, a media I/F 607, a display 608, a network I/F 609, a bus line 610, a keyboard 611, a mouse 612, and a DVD-RW drive 614.

Since these components employ the same configurations as those of the CPU 401, the ROM 402, the RAM 403, the HD 404, the HDD controller 405, the media I/F 407, the display 408, the network I/F 409, the bus line 410, the keyboard 411, the mouse 412, and the DVD-RW drive 414, the descriptions of thereof are omitted.

Further, as to the inspection information management server 6, the media I/F 607 controls reading and writing (storing) of data to a recording medium 615, such as flash memory. The DVD-RW drive 614 controls reading and writing of various data to a DVD-RW 613, which is an example of removable recording medium.
(Hardware Configuration of PC)

Hereinafter, with reference to FIG. 3, a description is given of hardware configuration of the PC 8. FIG. 3 also illustrates a hardware configuration of the PC 8.

As illustrated in FIG. 3, the PC 8 is configured with a computer including, for example, a CPU 801, a ROM 802, a RAM 803, a HD 804, a HDD controller 805, a media I/F 807, a display 808, a network I/F 809, a bus line 810, a keyboard 811, a mouse 812, and a DVD-RW drive 814.

Since these components employ the same configurations as those of the CPU 401, the ROM 402, the RAM 403, the HD 404, the HDD controller 405, the media I/F 407, the display 408, the network I/F 409, the bus line 410, the keyboard 411, the mouse 412, and the DVD-RW drive 414, the descriptions of thereof are omitted.

As to the PC 8, the media I/F 807 controls reading and writing (storing) of data to a recording medium 815, such as flash memory. The DVD-RW drive 814 controls reading and writing of various data to a DVD-RW 813, which is an example of removable recording medium.
(Functional Configuration of Communication System)

Figure 4:
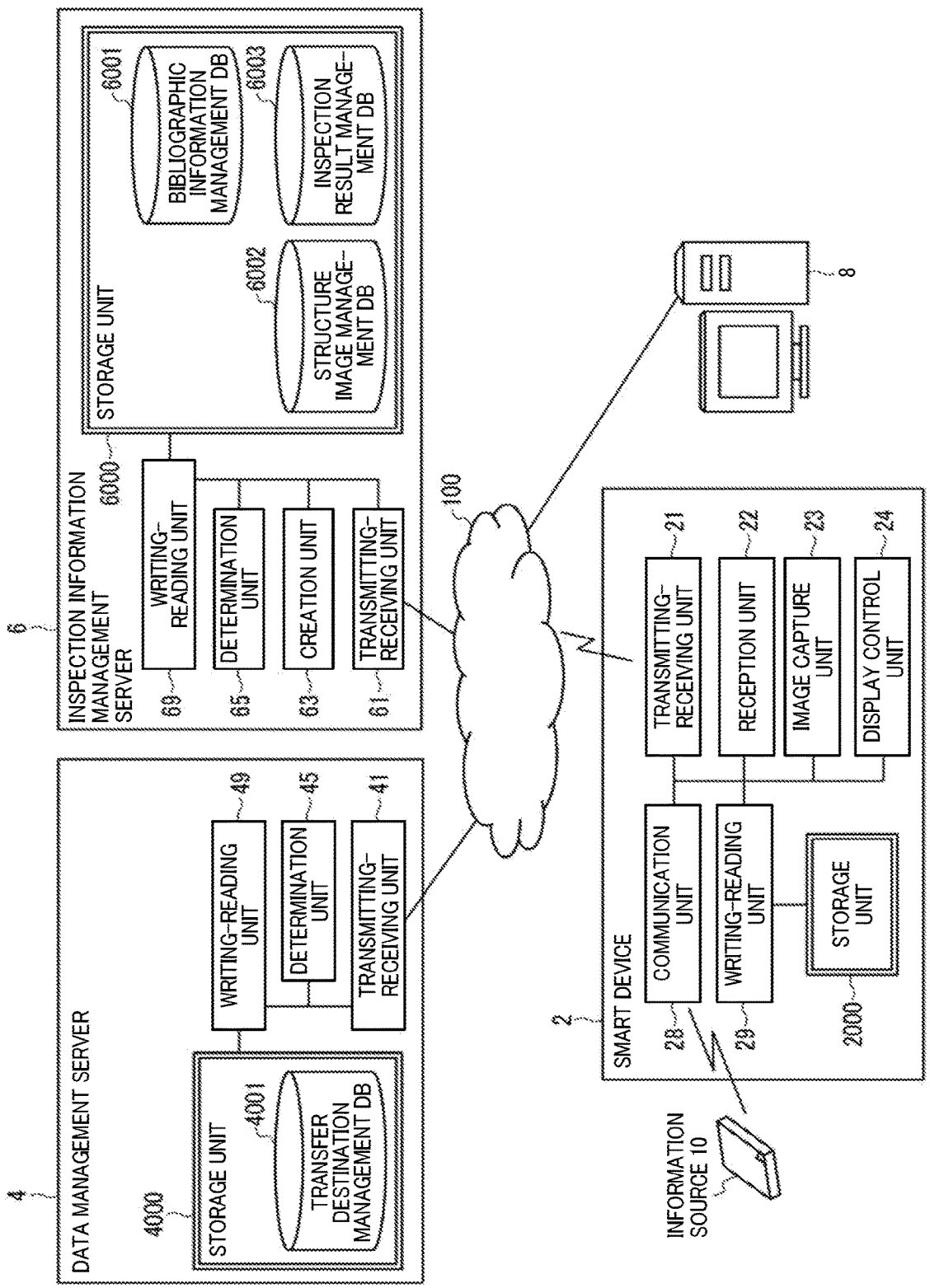
FIG. 4 is an example of configuration of functional block diagram of a communication system.

Hereinafter, with reference to FIGS. 2 and 4, a description is given of functional configuration of the embodiment. FIG. 4 is an example of configuration of functional block diagram of the communication system 1000.
(Functional Configuration of Smart Device)

Hereinafter, with reference to FIG. 4, a description is given of functional configuration of the smart device 2. As illustrated in FIG. 4, the smart device 2 includes, for example, a transmitting-receiving unit 21, a reception unit 22, an image capture unit 23, a display control unit 24, a communication unit 28, and a writing-reading unit 29. Each of these functions is a function or functional unit that is implemented by operating any one of the components of FIG. 2 under the instruction from the CPU 201 executing the programs for the smart device loaded on the RAM 203 from the EEPROM 204. The smart device 2 further includes a storage unit 2000, implemented by the RAM 203 and the EEPROM 204 illustrated in FIG. 2.
(Functional Configuration of Smart Device)

Hereinafter, with reference to FIG. 4, a description is given of functional configuration of the smart device 2 in detail.

The transmitting-receiving unit 21, implemented by an instruction from the CPU 201 illustrated in FIG. 2, communicates with other device, such as server and terminal, via the communication network 100.

The reception unit 22, implemented by an instruction from the CPU 201, receives, for example, an selection operation performed by a user (e.g., assistant B) via the touch panel 221.

The image capture unit 23 is implemented the CMOS 205 and the imaging element I/F 206, or the CMOS 213 and the imaging element I/F 214 under an instruction from the CPU 201.

The display control unit 24, implemented by an instruction from the CPU 201, displays various screens (e.g., images, characters) on the display 218.

The communication unit 28, implemented by an instruction from the CPU 201, performs short-range communication with the information source 10, such as IC tag or beacon transmitter, via the short-range communication circuit 220 and the antenna 220a.

The writing-reading unit 29, implemented by an instruction from the CPU 201, performs a process of writing various data to the storage unit 2000 and reading various data stored in the storage unit 2000.
(Functional Configuration of Data Management Server)

Hereinafter, with reference to FIG. 4, a description is given of functional configuration of the data management server 4. As illustrated in FIG. 4, the data management server 4 includes, for example, a transmitting-receiving unit 41, a determination unit 45, and a writing-reading unit 49.

Each of these functions is a function or functional unit that is implemented by operating any one of the components of FIG. 3 under the instruction from the CPU 401 executing the programs for the server loaded on the RAM 403 from the HD 404. Further, the data management server 4 includes a storage unit 4000, implemented the RAM 403 and the HD 404 illustrated in FIG. 3.

(Transfer Destination Management Table)

FIG. 5B is an example of transfer destination management table. The storage unit 4000 stores a transfer destination management database (DB) 4001 including the transfer destination management table illustrated in FIG. 5B. The transfer destination management table stores various information, such as information source ID, passcode, uniform resource locator (URL) of transfer destination (redirect destination) in association with each other.

The information source ID is information provided by the information source 10 to the communication terminal, such as the smart device 2. The information source ID is an information of identifying the information source 10 (an example of identification information identifying each information source 10).

The passcode is a string of characters and numbers used for authenticating each user (e.g., inspector A, assistant B) or the smart device 2. The passcode is an example of authentication information. The authentication information may also include a password. Further, if the attribute name (e.g., information source ID) is the same in various tables to be described in this disclosure, the same attribute name means the same content.

(Functional Configuration of Data Management Server)

Hereinafter, with reference to FIG. 4, a description is given of functional configuration of the data management server 4 in detail.

The transmitting-receiving unit 41, implemented by an instruction from the CPU 401 illustrated in FIG. 3, communicates with other device, such as server and terminal, via the communication network 100.

The determination unit 45, implemented by an instruction from the CPU 401 illustrated in FIG. 3, performs various determinations.

The writing-reading unit 49, implemented by an instruction from the CPU 401, performs a process of writing various data to the storage unit 4000 and reading various data stored in the storage unit 4000.

(Functional Configuration of Inspection Information Management Server)

Hereinafter, with reference to FIG. 4, a description is given of functional configuration of the inspection information management server 6. As illustrated in FIG. 4, the inspection information management server 6 includes, for example, a transmitting-receiving unit 61, a creation unit 63, a determination unit 65, and a writing-reading unit 69. Each of these functions is a function or functional unit that is implemented by operating any one of the components of FIG. 3 under the instruction from the CPU 601 executing the programs for the server loaded on the RAM 603 from the HD 604. Further, the inspection information management server 6 includes a storage unit 6000, implemented the RAM 603 and the HD 604 illustrated in FIG. 4.

FIG. 6A is an example of bibliographic information management table. The storage unit 6000 stores a bibliographic information management database (DB) 6001 (see FIG. 4) including the bibliographic information management table illustrated in FIG. 6A. The bibliographic information management table stores various information, such as information source ID, and bibliographic information in association with each other.

The bibliographic information indicates bibliographic information on each structure. The bibliographic information includes various information, such as structure name, location of structure, and inspection contractor in charge of inspecting the structure. The bibliographic information is registered by the administrator C from the PC 8 to the inspection information management server 6 in advance, prior to step S21 of FIG. 7 to be described later.

(Structure Image Management Table)

FIG. 6B is an example of structure image management table. The storage unit 6000 stores a structure image management DB 6002 (see FIG. 4) including the structure image management table illustrated in FIG. 6B. The structure image management table stores various information, such as information source ID, image capture date, and image data of structure in association with each other.

The image capture date indicates a date on which the image of structure was captured by the smart device 2. The image data of structure is image data of each structure captured and acquired on the image capture date. In this example case, the image capture date indicates that the inspection is being performed every year. Further, a plurality of image data of the structure can be associated with one image capture date.

(Inspection Result Management Table)

FIG. 6C is an example of inspection result management table. The storage unit 6000 stores an inspection result management DB 6003 (see FIG. 4) including the inspection result management table illustrated in FIG. 6C. The inspection result management table stores various information, such as information source ID, passcode, bibliographic information, inspection date, inspection result, review comment, and image data of structure in association with each other.

The inspection date indicates a date on which the structure Y was inspected by the inspector A and the assistant B. Since the image of the structure Y is captured on the inspection date, the inspection date is typically the same as the image capture date.

The inspection result is an inspection result of the structure determined by the inspector A. The review comment is a comment on the inspection result of the structure determined by the inspector A. Further, a plurality of image data of the structure can be associated with one inspection date (image capture date).

(Functional Configuration of Inspection Information Management Server)

Hereinafter, with reference to FIG. 4, a description is given of functional configuration of the inspection information management server 6 in detail.

The transmitting-receiving unit 61, implemented by an instruction from the CPU 601 illustrated in FIG. 3, communicates with other device, such as server and terminal, via the communication network 100.

The creation unit 63, implemented by an instruction from the CPU 601 illustrated in FIG. 3, creates data on a search result registration screen, to be described later with reference to FIG. 10.

The determination unit 65, implemented by an instruction from the CPU 601 illustrated in FIG. 3, performs various determinations.

The writing-reading unit 69, implemented by an instruction from the CPU 601, performs a process of writing various data to the storage unit 6000 and reading various data stored in the storage unit 6000.

(Processing and Operation)

Figure 7:
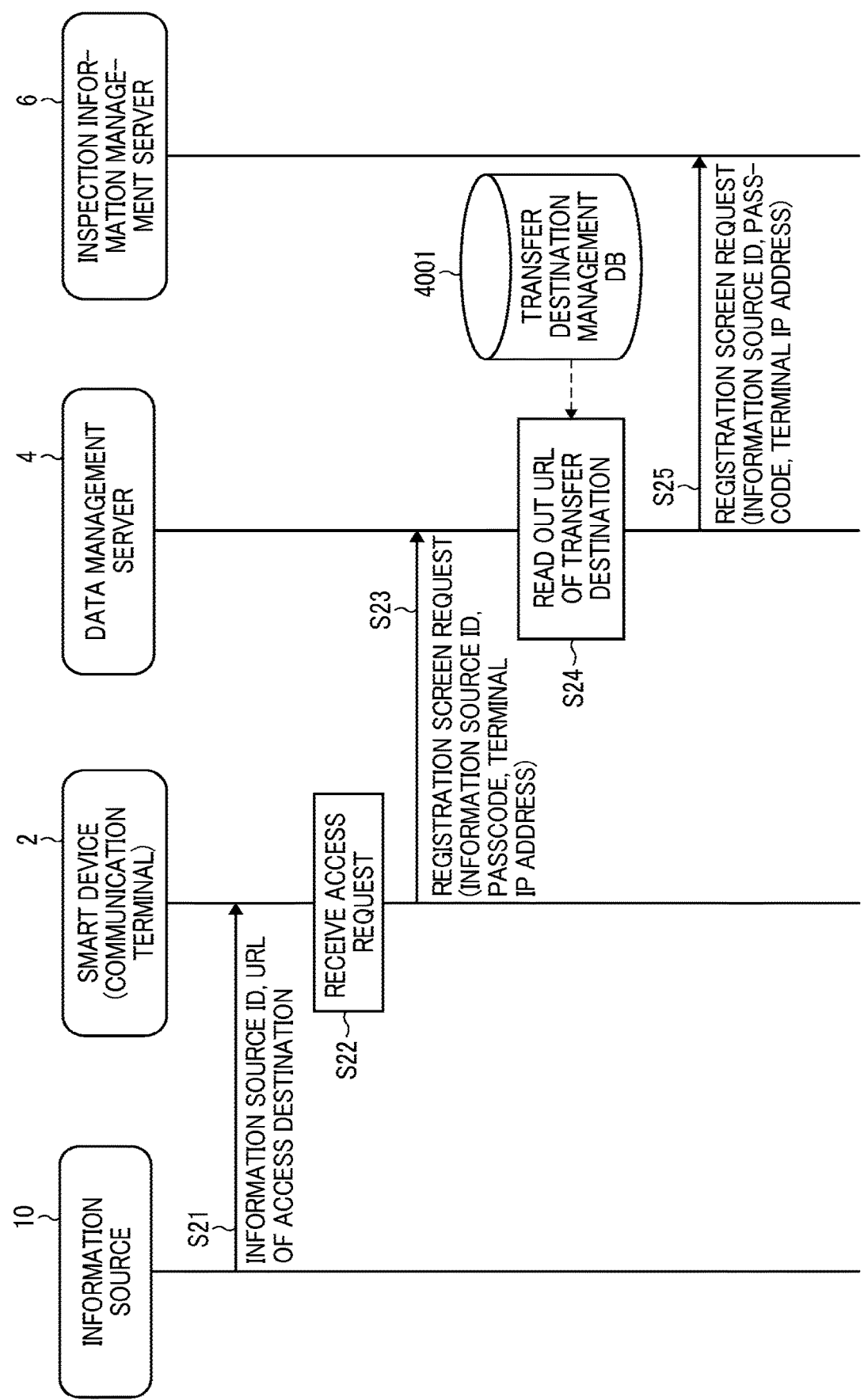
FIG. 7 is an example of sequence diagram illustrating a process of requesting a registration screen of inspection result.

Hereinafter, with reference to FIGS. 1 and 7 to 11, a description is given of processing and operation of the embodiment. As illustrated in FIG. 1, hereinafter, a description is given of an example case where the inspector A and the assistant B has visited the inspection location X and approached the information source 10 of the structure Y (i.e., inspection target). FIG. 7 is an example of sequence diagram illustrating a process of requesting a registration screen of inspection result.

(Request of Registration Screen of Inspection Result)

Hereinafter, with reference to FIGS. 7 and 8, a description is given of request processing of the registration screen of inspection result.

Figure 8A:
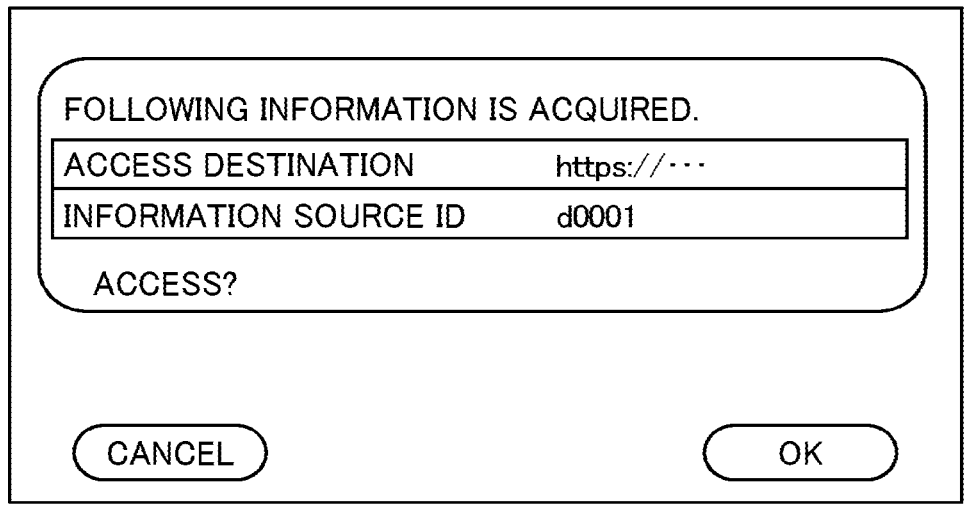
FIG. 8A is an example of confirmation screen displayable on a smart device.

When the assistant B carrying the smart device 2 approaches the information source 10 of the structure Y (i.e., inspection target), the smart device 2 acquires the information source ID and the URL of access destination (see FIG. 5A) from the information source 10 (step S21). Then, at the smart device 2, the display control unit 24 displays a confirmation screen illustrated in FIG. 8A on the display 218 of the smart device 2. FIG. 8A is an example of confirmation screen displayable on the smart device 2.

Then, the reception unit 22 receives an access request to the access destination from the assistant B (step S22). When the smart device 2 acquires the URL of the access destination and then accesses the URL, in steps S44 to S48 to be described later in FIG. 9, a web browser installed on the smart device 2 can display an inspection result registration screen, receive an input of search result, and transmit image data, or the like on the smart device 2.

Figure 8B:
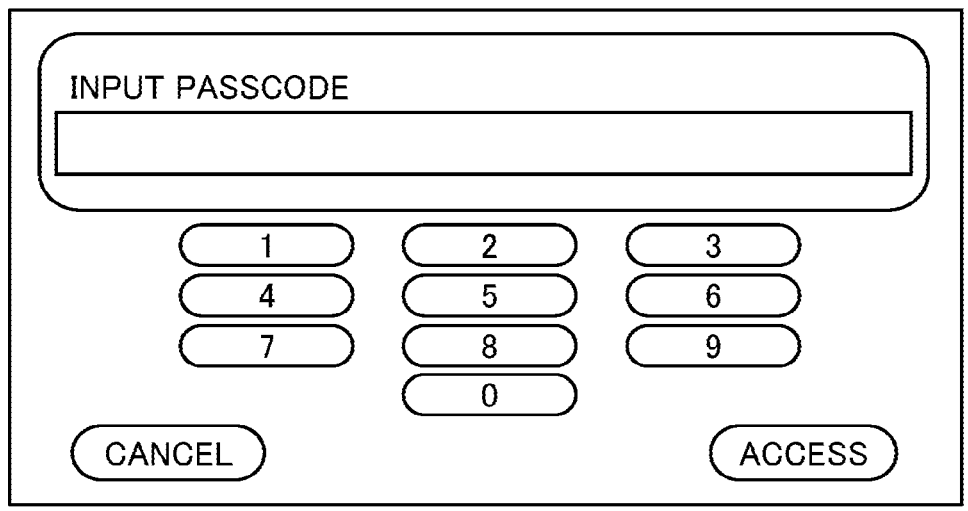
FIG. 8B is an example of passcode input screen displayable on a smart device.

With reference to FIGS. 8A and 8B, step S22 is described in detail. FIG. 8B is an example of passcode input screen displayable on the smart device 2.

As to the confirmation screen displayed on the smart device 2 illustrated in FIG. 8A, an upper part of the confirmation screen displays the information source ID and the URL of access destination received in step S21 from the information source 10. Further, the confirmation screen displays "OK" button and "CANCEL" button at the bottom part of the confirmation screen. In this example case, if the assistant B presses the OK button, the reception unit 22 receives a selection of the OK button, and then the display control unit 24 switches a display to the passcode input screen illustrated in FIG. 8B.

The passcode input screen displays a passcode input field at the upper part, a numeric keypad at the middle part, and "ACCESS" button and "CANCEL" button at the bottom part of the passcode input screen. If the assistant B presses the numeric keypad to input the passcode, and then presses "ACCESS" button, the reception unit 22 receives the access request to the access destination. If the assistant B presses "CANCEL" button illustrated in FIGS. 8A and 8B, the access request is not received.

Then, when the reception unit 22 receives the pressing of "ACCESS" button (see FIG. 8B), the transmitting-receiving unit 21 transmits a registration screen request indicating a request of the registration screen used for registering the inspection result of structure to the data management server 4 based on the URL of the access destination acquired in step S21 (step S23). The registration screen request includes, for example, the information source ID acquired in step S21, the passcode and the terminal IP address indicating the IP address of the smart device 2 received in step S22. Then, the transmitting-receiving unit 41 of the data management server 4 receives the registration screen request from the smart device 2.

Further, the transmitting-receiving unit 21 does not necessarily have to transmit the IP address of the smart device 2. However, by transmitting the IP address, the smart device 2 can perform a bidirectional communication (e.g., real-time check, chat bot) with the PC 8 used by the administrator C at a later stage.

Then, at the data management server 4, the writing-reading unit 49 uses a combination of the information source ID and the passcode received in step S23 as a search key to search the transfer destination management DB 4001 (see FIG. 4) to read out a URL of the corresponding transfer destination (step S24). The processing of step S24 also serves as an authentication processing of the smart device 2.

Then, the transmitting-receiving unit 41 transfers the registration screen request to the inspection information management server 6 based on the read-out URL of the transfer destination (step S25). The transferred registration screen request includes, for example, the information source ID, the passcode, and the terminal IP address received in step S23. Then, the transmitting-receiving unit 61 of the inspection information management server 6 receives the transferred registration screen request from the data management server 4.

(Registration of Inspection Result)

Hereinafter, with reference to FIGS. 9 to 11, a description is given of registration processing of the inspection result. FIG. 9 is an example of sequence diagram illustrating a process of registering the inspection result.

When the inspection information management server 6 receives the registration request in step 25 (FIG. 7), the writing-reading unit 69 of the inspection information management server 6 uses the information source ID received in step S25 as a search key to search the bibliographic information management DB 6001 (see FIG. 4) to read out the corresponding bibliographic information (step S41).

Then, the writing-reading unit 69 uses the information source ID received in step S25 as a search key to search the structure image management DB 6002 (see FIG. 4) to read out a specific set of past or previous image data related to corresponding specific structure and corresponding image capture date, stored in the past or previously (step S42).

Further, the writing-reading unit 69 can be configured to read out the specific set of image data of past or previous image data related to corresponding specific structure and corresponding image capture date (inspection date), which corresponds to the information source ID, from the inspection result management DB 6003 instead of the structure image management DB 6002. In this case, the structure image management DB 6002 can be omitted from the configuration illustrated in FIG. 4.

Then, the creation unit 63 creates data of inspection result registration screen, to be described later in FIG. 10, based on the processing in steps S41 and S42 (step S43).

FIG. 10 is an example of inspection result registration screen displayable on the smart device 2 as an initial screen. The inspection result registration screen is an example of screen displayable on the communication terminal, such as the smart device 2.

Then, the inspection information management server 6 transmits the data of inspection result registration screen, created in step S43, to the smart device 2, which is a request source of the registration screen (step S44).

Then, in response to receiving the data of inspection result registration screen in step S44, at the smart device 2, the display control unit 24 instructs the display 218 to display the inspection result registration screen illustrated in FIG. 10 by executing a web browser (step S45). Hereinafter, with reference to FIG. 10, a description is given of the inspection result registration screen displayed on the smart device 2 as the initial screen.

As illustrated in FIG. 10, the inspection result registration screen displayed as the initial screen displays, for example, the URL of the inspection result registration screen, and instruction sections of "STEP1, STEP2, and STEP3." A user (e.g., assistant B) perform given processing in accordance with the instructions displayed in "STEP1, STEP2, and STEP3."

The section of "STEP1" displays, for example, the bibliographic information, such as structure name, location name, and inspection contractor name. The bibliographic information is received in step S44. Further, the section of "STEP1" displays an input field "a1" used for inputting inspection date, inspection result, and review comment. The inspection result can be selected by a pull-down menu or the like.

Further, the "inspection date" can be displayed as the bibliographic information in advance. In this case, the inspection date is also registered in advance as similar to the structure name, in which the inspection date indicates "expected or scheduled inspection date."

Further, the section of "STEP2" displays the past or previous images of the structure Y, which is the current inspection target, as an initial displaying. The past or previous images are received in step S44.

Further, the section of "STEP2" displays a latest image display field "a2," and an add button "a3." The latest image display field "a2" is to be used to display the latest image of the structure Y to be captured by the assistant B. The add button "a3" is a button used for switching from the inspection result registration screen being displayed currently to an image capture screen.

Further, instead of using the add button "a3," a sample image can be displayed in the latest screen display field "a2," and the sample image can be used as a trigger to switch the display screen from the inspection result registration screen, being displayed currently, to the image capture screen. In this case, the add button "a3" is used as a button that is to be pressed at the time of the second and subsequent image capture operations.

Further, the section of "STEP3" displays "UPLOAD" button and "CANCEL" button. The "UPLOAD" button is a button used for uploading each data, input in "STEP1" and "STEP2," to the inspection information management server 6. The CANCEL button is a button used for cancelling the uploading of data.

At first, the assistant B checks the bibliographic information in the section of "STEP1" displayed on the inspection result registration screen.

Then, the reception unit 22 receives an input of inspection-related information, such as inspection date, inspection result, and review comment in the input field "a1" performed by the assistant B (step S46).

Since the inspection result and the determination of the review comment require expert knowledge, the assistant B inputs the inspection result and the determination of the review comment under the instruction of the inspector A. Further, since the inspection result can be selected by a pull-down menu or the like, the assistant B can select the inspection result under the instruction of the inspector A. Further, since the review comment can be input or described freely, the assistant B inputs the review comment under the instruction of the inspector A.

Then, the sequence proceeds to "STEP2," in which the inspector A and the assistant B refer to the past or previous images of the structure to determine photography composition of the same structure to be captured at the current inspection work that is being performed at the current time.

Then, after the reception unit 22 receives the pressing of the add button "a3" performed by the assistant B, the display control unit 24 switches the display screen from the inspection result registration screen (see FIG. 10) to the image capture screen, and then if the reception unit 22 receives an image capture operation performed by the assistant B, the image capture unit 23 captures one or more images of the structure, which is the current inspection target (step S47). Then, the display control unit 24 displays the image of the structure acquired by performing the image capture operation on the latest image display field "a2."

Further, the image capture operation can be performed for a plurality of times during the display of the image capture screen.

Further, the image capture operation can be performed for a plurality of times by returning to the inspection result registration screen after the end of one image capture operation, receiving the pressing of the add button "a3" at the reception unit 22 again, and displaying the image capture screen for next image capture operation. In this case, the latest image display field "a2" displays a plurality of the latest images, and then the assistant B consults the inspector A to select a specific image from the captured images.

Then, the sequence proceeds to "STEP3." If the reception unit 22 receives the pressing of "UPLOAD" button performed by the assistant B, the transmitting-receiving unit 21 transmits the inspection result to the inspection information management server 6 (step S48). The inspection result includes, for example, the information source ID, the inspection-related information input in step S46 (i.e., inspection date, inspection result, review comment), and the data of the latest image of the structure captured in step S47. Then, the transmitting-receiving unit 61 of the inspection information management server 6 receives the inspection result from the smart device 2.

Further, if the image capture operation was performed for a plurality of times, among a plurality of the latest image data of the structure, the smart device 2 transmits at least one image data selected by the assistant B in step S48 to the inspection information management server 6. In this case, prior to step S48, the display control unit 24 displays a plurality of the latest image data of the structure (e.g., thumbnail images), and then the reception unit 22 receives a selection of the desired image data performed by the assistant B.

Alternatively, prior to step S48, the display control unit 24 can be configured to display a plurality of the latest image data of the structure (e.g., thumbnail images) one by one, and displays a screen prompting the assistant B to select whether or not to upload each image data, in which the reception unit 22 receives the selection of uploading or not uploading from the assistant B for each image data.

Then, at the inspection information management server 6, the writing-reading unit 69 uses the information source ID received in step S48 as a search key to search the structure image management DB 6002 (see FIG. 4) to store the inspection date received in step S48 in a recording area of a memory set for image capture date, and store the latest image data of structure received in step S48 in a recording area of the memory set for image data of the corresponding structure (step S49).

Further, if the information source ID received in step S48 is not yet stored in the structure image management DB 6002 (see FIG. 4), the writing-reading unit 69 newly stores the information source ID, the image capture date (inspection date), and the latest image data of the structure received in step S48 in association with each other in the structure image management DB 6002. Further, if the information on the image capture date is attached as metadata of the latest image data of the structure, the attached information of the image capture date may be stored as the image capture date in the structure image management DB 6002.

Then, the writing-reading unit 69 stores the information (i.e., information source ID, passcode) received in step S25 (FIG. 7), the bibliographic information read out in step S41, and the inspection-related information (i.e., inspection date, inspection result, review comment, latest image data of structure) received in step S48 in association with each other in the inspection result management DB 6003 (see FIG. 4) as a new record (step S50).

Further, the writing-reading unit 69 can be configured not to store the passcode. In this case, in step S25 (FIG. 7), the data management server 4 is not required to transfer the passcode to the inspection information management server 6.

Further, the inspection result management DB 6003 (see FIG. 4) may not employ a table-format illustrated in FIG. 6C. For example, the inspection result management DB 6003 can store the information source ID, passcode, and URL of the inspection result registration screen illustrated in FIG. 11 in association with each other.

As to the above described embodiment, the information source 10 is associated with the structure Y, for example, by attaching the information source 10 on the structure Y existing at the inspection location (inspection site) X, and the inspection information management server 6 stores the information source ID (example of identification information) and the past or previous image data of the structure Y in association with each other. With this configuration, when the smart device 2 acquires the information source ID from the information source 10, and transmits the acquired information source ID to the data management server 4, the inspection information management server 6 can transmit the past or previous image data of the structure Y to the smart device 2. With this configuration, the inspector A and the assistant B can easily acquire the past or previous image data of the structure Y, which is the current inspection target, with which the photography composition of the structure Y to be captured can be easily determined for the inspector A and the assistant B who are performing the inspection work currently.

As to the above described embodiment, images of specific structures can be acquired with the same or similar photography composition of the specific structures easily when the inspector and the assistant are performing the inspection work currently.

Further, if the structure Y is a real estate, such as condominium and apartment, a real estate agent (inspector A, assistant B) can perform an inspection of real estate for checking dirt or damage in a room just before a rent person moves into the room and immediately after the rent person moves out the room, and transmit captured image data of the inspected room to the inspection information management server 6.

Further, the smart device 2 can acquire not only the information source ID, but also the URL of the access destination, illustrated in FIG. 5A, from the information source 10. With this configuration, the assistant B does not have to consider which URL is required be accessed to register the inspection result of the structure Y, with which the assistant B can easily perform the registration of the latest image data of the structure Y at the inspection location (inspection site) X.

In the above described embodiment, the information source ID is information provided by the information source 10 to the communication terminal, such as the smart device 2, and the information source ID is an example of identification information identifying the information source 10, but is not limited thereto. For example, the information source ID provided by the information source 10 can include information that identifies something other than information that identifies the information source 10 itself. For example, if the information source 10 is a global positioning system (GPS) satellite, the identification information includes, for example, position information based on GPS signal.

Each function of the above-described embodiment can be implemented by one or more processing circuits. The "processing circuit" includes a processor which is programmed to perform each function by software such as a processor implemented by an electronic circuit, and device designed to perform each function described above, such as application specific integrated circuit (ASIC), digital signal processor (DSP), field programmable gate array (FPGA), conventional circuit module, and the like.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

What is claimed is:

1. A server for managing inspection information of one or more building structures comprising:
    circuitry configured to
    store identification information uniquely assigned to an information source associated with a building structure, and image data of the building structure previously captured in association with each other as an inspection result of the building structure;
    receive from a communication terminal, via a communication network, the identification information of the information source acquired by the communication terminal;
    create data of a screen used for displaying the image data of the building structure previously captured corresponding to the identification information received from the communication terminal; and
    transmit the data of the screen used for displaying the image data of the building structure previously captured to the communication terminal via the communication network.

2. The server of claim 1,
    wherein the information source is associated with the building structure by attaching the information source on the building structure.

3. The server of claim 1,
    wherein the information source is a seal having quick response (QR) code embedded with the identification information, wherein the information source is associated with the building structure by attaching the information source on the building structure.

4. The server of claim 1,
wherein the information source is at least any one of an integrated circuit (IC) tag that transmits the identification information, and a beacon transmitter that transmits the identification information.

5. The server of claim 1,
wherein the circuitry stores the identification information unique to the information source in association with a plurality of image data of the building structure previously captured, in a memory,
wherein the circuitry displays, on a display, each of the plurality of image data of the building structure previously captured with corresponding one of a plurality of image capture dates.

6. A communication system comprising:
a communication terminal; and
a server for managing inspection information of one or more building structures including
circuitry configured to
store identification information uniquely assigned to an information source associated with a building structure, and image data of the building structure previously captured in association with each other as an inspection result of the building structure;
receive from the communication terminal, via a communication network, the identification information of the information source acquired by the communication terminal;
create data of a screen used for displaying the image data of the building structure previously captured corresponding to the identification information received from the communication terminal; and
transmit the data of the screen used for displaying the image data of the building structure previously captured to the communication terminal via the communication network.

7. The communication system of claim 6,
wherein the communication terminal includes
a display configured to display the image data of the building structure previously captured,
an image capturer configured to capture an image of the building structure, and
another circuitry configured to
transmit latest image data of the building structure captured by the image capturer to the server via the communication network,
wherein the circuitry of the server receives the latest image data of the building structure, and stores the identification information of the information source, and the latest image data of the building structure in association with each other, in a memory.

8. The communication system of claim 6,
wherein the communication terminal is any one of a smart device, a tablet personal computer, a laptop computer, a smart watch, and a portable game machine.

9. A method of managing inspection information of one or more building structures comprising:
storing identification information uniquely assigned to an information source associated with a building structure, and image data of the building structure previously captured in association with each other as an inspection result of the building structure;
receiving from a communication terminal, via a communication network, the identification information of the information source acquired by the communication terminal;
creating data of a screen used for displaying the image data of the building structure previously captured corresponding to the identification information received from the communication terminal; and
transmitting the data of the screen used for displaying the image data of the building structure previously captured to the communication terminal via the communication network.

10. The method of claim 9,
wherein the information source is associated with the building structure by attaching the information source on the building structure.

11. The method of claim 9,
wherein the information source is a seal having quick response (QR) code embedded with the identification information,
wherein the information source is associated with the building structure by attaching the information source on the building structure.

12. The method of claim 9,
wherein the information source is at least any one of an integrated circuit (IC) tag that transmits the identification information, and a beacon transmitter that transmits the identification information.

13. The method of claim 9, further comprising:
storing identification information unique to the information source in association with a plurality of image data of the building structure previously captured, in a memory; and
displaying, on a display, each of the plurality of image data of the building structure previously captured with corresponding one of a plurality of image capture dates.

14. The server of claim 1,
wherein the communication terminal is any one of a smart device, a tablet personal computer, a laptop computer, a smart watch, and a portable game machine.

15. The method of claim 9,
wherein the communication terminal is any one of a smart device, a tablet personal computer, a laptop computer, a smart watch, and a portable game machine.

16. The server of claim 1,
wherein the building structure is a bridge or tunnel.

17. The communication system of claim 6,
wherein the building structure is a bridge or tunnel.

18. The method of claim 9,
wherein the building structure is a bridge or tunnel.

* * * * *